UNITED STATES PATENT OFFICE.

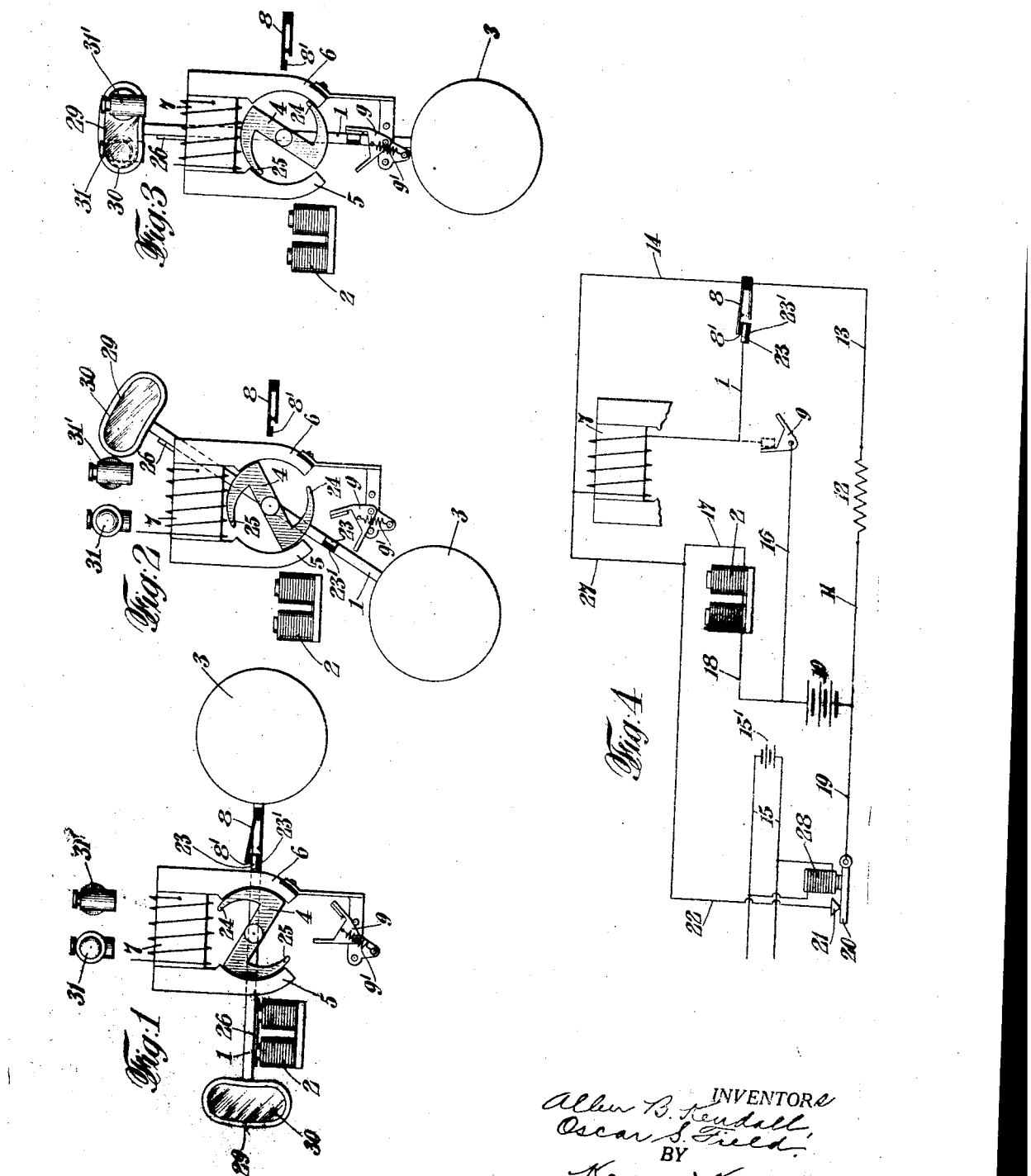

ALLEN B. KENDALL AND OSCAR S. FIELD, OF ELIZABETH, NEW JERSEY, ASSIGNORS TO HALL SWITCH & SIGNAL CO., A CORPORATION OF MAINE.

SIGNAL.

1,301,949.

Specification of Letters Patent.

Patented Apr. 29, 1919.

Application filed February 19, 1916. Serial No. 79,273.

*To all whom it may concern:*

Be it known that we, ALLEN B. KENDALL, a citizen of the United States, and OSCAR S. FIELD, a subject of the King of Great Britain, both residents of Elizabeth, county of Union, State of New Jersey, have invented certain new and useful Improvements in Signals, of which the following is a specification.

Our invention relates to signals for grade crossings of railroads and highways, and for drawbridges or the like. The object of the invention is to provide a signal which will give a uniform clear signal indication and a varying danger indication in the normal operation of the device, but which, upon failure of energy, will give a uniform danger signal indication. More particularly, the invention herein described is adapted to give a uniform clear signal indication by holding a disk or other indicating member in one position, and a danger indication by vibrating or reciprocating or oscillating the same or another disk alternately to opposite sides of a given line when energy is supplied to produce a danger indication, but upon the failure of energy to give a danger indication by permitting the disk to assume a position different from that giving the clear indication and remain stationary.

In the daytime, this signal may be given by the disk, while, in the nighttime, the indication may be given by lights instead of the disk, and the invention is understood to embody either or both or any other equivalent means of displaying or transmitting these signal indications during the day or night.

Another object of our invention is to provide a signal which will give like indications in two directions, and in the embodiment of our invention herein described this object is attained by arranging an indicating member to give the same indication when viewed from different directions and also arranging lanterns to give indications visible from different directions and simultaneously changing the character of the indication given by them, as by passing a color screen before them.

Our invention will be better understood by reference to the following description, taken in connection with the drawings forming a part hereof and in which:—

Figure 1 represents a device embodying the invention in a position indicating "clear;"

Fig. 2 indicates the device shown in Fig. 1 when in oscillating danger position;

Fig. 3 shows the device shown in Fig. 1 when in the deënergized position; and

Fig. 4 shows a diagrammatic illustration of the electrical circuits.

In signals of this character, it is important that the indicator be held at clear position in such a way that, upon failure of current in the system, the indicator will go to danger. It is also important, in a device of this character, that the danger indication, under normal operation, should be of such a character as to surely attract attention. The most satisfactory form is some kind of a movable danger signal indication.

These indications are given at night by differently colored lights. In the clear position, the indicator is held horizontally, and at night a white light is continuously exhibited. The moving danger indication, in the present embodiment, consists in vibrating, reciprocating or oscillating the indicator to positions on each side of a given line, while at night red and white lights may be alternately flashed, or any other suitable combination of lights, or any adaptable variation of a single light, may be used. This device is so arranged that, upon failure of the energy which acts to hold it in clear position, or, upon failure of the energy which acts to give the vibrating danger indication, it will assume a stationary position, giving a continuous danger indication.

The arrangement of continuously exhibiting different indications for different conditions is well understood in this art, but applicants know of no prior use of the combination of signal indications above-outlined, that is, a continuous clear indication, a moving or varying danger indication, and also a continuous danger indication different from the clear indication.

Referring to the drawings attached hereto, the construction and operation of the device will be seen from Figs. 1, 2 and 3, while the circuit connections are shown in Fig. 4.

As shown in Fig. 1, the indicator arm 1 is in clear position, and is held by the magnet 2 in horizontal position. The end of the indicator on which the disk 3 is fastened is heavier than the opposite end, so that, upon release by the holding magnet 2, the indicator arm 1 will tend to assume a vertical position, with the disk downward. Attached to the indicator is a Z-shaped armature 4, adapted to revolve or oscillate between the pole pieces 5 and 6 of the field magnet 7. It is this motor which causes the oscillations hereinafter more fully described. There is a switch 8 in the circuit of the motor, which is held open by the arm 1 pressing against the insulation block 8' when the indicator is in clear position. This switch is closed upon the initial movement of the indicator from clear position. This switch controls one point in the normal operating circuit of the motor. The motor circuit is intermittently closed at a second point whenever the contact 23 engages the brush contact member 9. This contact member has two positive positions, in either of which it may be held by the action of the spring 9', and it is moved to these two positions by the indicator arm as it is oscillated to give the danger indication, being moved to one position by the contact 23 and to the other by insulation 23'.

The arrangement between this contact and the indicator is such that the motor circuit is not closed by movement of the indicator away from its clear position, but is closed, and then for a short time only, while the indicator is moving in a counter-clockwise direction, or in a direction toward clear position. During this short period of time the motor is energized through the following circuit: battery 10, wire 11, resistance 12, wire 13, switch 8, wire 14, field of motor 7, indicator arm 1, contact 9, wire 16, to battery. This continues the oscillation of the indicator, it being understood that the indicator makes a movement in a clockwise direction, or away from clear position, by reason of gravity. It will be noted that this circuit includes the battery 10 and the resistance 12. The holding coil 2 has a second circuit, as follows: battery 10, wire 11, resistance 12, wire 13, switch 8, wire 14, wire 27, wire 17, wire 18, to battery. This circuit includes the resistance and switch 8 for the purpose hereinafter described.

The normal circuit for the holding magnet is as follows: battery 10, wire 19, contacts 20 and 21 controlled by a track relay, wire 22, wire 17 and wire 18, to battery. There is no resistance in this normal circuit, and it is controlled by the track relay 28 connected across the track section 15, which is energized by the battery 15'.

The operation of the device is as follows: When the track section 15 is clear, the contacts 20 and 21 are closed by the track relay, and the indicator is held in the position shown in Figs. 1 and 4,—that is, in a horizontal position and with the switch contacts 8 separated. Upon the entry of a train in the track section 15 guarded by this signal, the contacts 20 and 21 of relay 28 are separated, thus deënergizing the holding magnet 2 and permitting the indicator arm 1 to swing in a clockwise direction. Upon the initial movement of the indicator from clear position, the switch contacts 8 are closed, thus closing one point of the motor circuit and completing a second circuit for the holding magnet, including the resistance 12, as above given. As the indicator arm 1 moves in a clockwise direction, it throws the contact 9 over, as indicated in Fig. 2, but does not make electrical contact therewith, as the insulation 23' protects the contact 23, and, when the indicator arm has spent its force in the clockwise direction, it returns in a counter-clockwise direction and comes into engagement with the other side of the contact 9, thus completing the circuit of the motor through the resistance and causing the motor to give a kick to the indicator to continue the oscillations, for the contact 23 remains in engagement with the contact 9 as the brush swings about its pivot against the action of spring 9'. It will be noted that this electrical contact is made just as the points 24 and 25 of the Z-shaped armature 4 come near the pole pieces 6 and 5, respectively, of the motor. This arrangement insures the efficient operation of the motor for the purpose of continuing the oscillations of the indicator.

It will be noted that at this time the motor circuit is completed through the resistance 12, which is such that the force exerted on the indicator arm will not be sufficient to throw it around far enough, so that the armature 26 on the extended end of the indicator arm is held by the holding magnet. Another precaution against this is the connection of the resistance in the circuit of the holding magnet, thereby greatly reducing the magnetic flux of the holding magnet. When the track is clear and the indicator kicked to clear position and the resistance removed from the circuit of the holding magnet, it will immediately become magnetically saturated and will surely retain the indicator in the clear position. The oscillation of the indicator will continue indefinitely, or until the section of track guarded by this signal is clear, whereupon the relay contacts 20 and 21 will again be closed, thereby putting full battery strength upon the holding magnet, through the circuit 10, 19, 20, 21, 22, 17, 2, 18, and, when electrical contact is made between the indicator arm 1 and contact 9, the full battery will also be applied to the motor, as follows: battery 10, wire 19, contacts 20 and 21, wire 22, wire 27, field of motor 7, indicator arm 1, contact 9 and wire 16, to batery. The motor strength will be so greatly increased that the indicator arm will be given a sufficient kick to throw the armature 26 around into the magnetic field of the holding coil 2, which will retain the indicator in clear position, and, at the same time, open the contacts of the switch 8.

It will be seen that, if at any time the power fails in the battery 10, the indicator will of its own accord assume a normal or non-actuated vertical position, which is one of the danger indications, and which would at night produce a continuous red light.

The indicator arm 1 extends out from the axis of the armature in the direction opposite to that part of the arm which carries the indicator 3. This extended portion carries the armature 26, which coöperates with the holding magnet 2, and upon its end is mounted a frame 29, which carries a screen 30, preferably colored red. On each side of the line extending vertically from the axis of the armature a lantern is positioned. One of these lanterns 31 is arranged to throw a beam of light in one direction, and the other lantern 31' is arranged to throw a beam of light in another, for instance, the opposite direction. In the embodiment shown and described herein, these beams will be parallel and in opposite directions. These lamps are on opposite sides of the plane of movement of the screen 30 at a distance from the axis of the armature equal to the distance between the center of the screen and the axis of the armature, so that the screen will pass between them, and the screen is elongated, so that it will cover the openings of both lanterns at the same time. An indication of the same character is given in two directions at the same time in this way. It will be seen that the nighttime indications are given by the coöperation of the screen and the light, for, when the disk 3 is in the position shown in Fig. 1, it gives a clear indication, and at that time the white light is uncovered. Whenever the indicator arm is vibrating, the colored screen is passing back and forth past the white light, and an alternate white light and colored light will be given as the moving or varying danger indication. If the energy which vibrates the motor armature should fail, the weight of the disk 3 will cause the arm to assume a vertical biased position, and the screen 30 will remain constantly in front of the lantern 31, and the normal or non-actuated or uniform danger indication will be given.

It will be noted from the structure described and illustrated that the indicator arm can only be brought to a horizontal position with the indicator 3 at the right as shown in Fig. 1, for it is only when the arm 1 is swinging counter-clockwise that the motor will receive a rotating kick or impulse, either through the resistance 12 or by the full effect of the battery. There is, therefore, no possibility of the indicator 3 ever being held in a position at the left side of the armature.

From the above description, it will be evident that a device has been devised which has a fixed clear position and gives a uniform clear indication, which has a plurality of different danger indications, one of which is a moving indication, the other of which is a stationary position, giving a continuous indication, and which latter position is assumed upon the failure of power in the local battery furnishing power for the operation of the signal.

This arrangement has distinct advantages, in that during normal operation of the device the best kind of danger signal indication is given, that is, a moving indication, while at the same time, if the movement is made impossible by failure of energy, the device assumes a position which gives, nevertheless, a uniform danger indication. The importance of this arrangement will be readily appreciated by those skilled in the art as adding greatly to the safety of signals used for such places as the crossings of railroads and highways and for drawbridges on railroads, and many other places of similar character.

While only one embodiment of the invention has been illustrated and described, it is to be understood that our invention is in nowise limited to this specific embodiment, but such variations, adaptations and modifications as may occur to those skilled in the art are included in our invention, the scope of which we intend to be defined by the claims appended hereto.

What we claim as new and desire to secure by Letters Patent of the United States is the following:—

1. In a signal, the combination of a signal indicator, electro-magnetic means for holding said indicator in clear position, a circuit for said holding means under the control of a track relay, a motor for vibrating said signal member to give a danger indication, a circuit for said motor open at two points, one of which points is closed upon initial movement of the signal indicator from clear position and the other of which points is closed by said signal indicator during each movement of the indicator in a direction toward clear position, thereby closing the circuit of the motor and supplying energy to continue the vibrating of said signal member.

2. In a signal, the combination of a signal indicator, electro-magnetic means for holding said signal in clear position, a normally closed circuit for said holding means, a motor for giving to said signal indicator a vibrating danger indication, a source of energy for said means and said motor, a circuit for said motor normally open at two points, means for closing said circuit at one point upon the initial movement of said signal indicator, and means for closing the other point of said motor circuit through a resistance in said circuit intermittently during the operation of said signal indicator, and a circuit for said motor controlled by track conditions for applying said source to said motor without said resistance to return said signal indicator to clear position.

3. In a signal, the combination of a signal indicator, electro-magnetic means for holding said indicator in clear position, a circuit for said holding means including contacts of a track relay, a motor for operating said indicator, a circuit for said motor including a resistance and open at two points, means for closing said circuit at one point upon initial movement of said indicator, which means completes a second circuit for said holding magnet including said resistance, and means for intermittently closing the other open point of said motor circuit to give to said indicator an oscillatory movement.

4. In a signal, the combination of a signal indicator, electro-magnetic means for holding said indicator in clear position, a circuit for said holding means including contacts of a track relay, a motor for operating said indicator, a circuit for said motor including a resistance and open at two points, means for closing said circuit at one point upon initial movement of said indicator, which means completes a second circuit for said holding magnet including said resistance, and means for closing the other point of said circuit upon movement of said indicator in one direction only to give to said indicator an oscillatory movement.

5. In a signal, an indicating device, means for causing said device to give a uniform indication, electrically operated means for causing said device to give a varying indication, a circuit for said last named means and including two switches, one of said switches being adapted to be closed upon said first named means becoming inoperative and the second being adapted to be intermittently closed by the variation of the indication of said device, and a shunt around one of said switches and dependent for its continuity upon the condition of a trackway.

6. In a signal, an indicating device, electrically operated means for causing said device to give a uniform indication, electrically operated means for causing said device to give a varying indication, said means being connected in parallel circuits, means for strongly energizing said circuits and dependent upon the condition of a trackway and means for weakly energizing said circuits and dependent upon the condition of said indicating device.

7. In a signal, a member mounted for movement having a biased danger position, energized means for holding said member out of the biased position in a clear position, means for vibrating said member, and means for projecting beams of light in different directions and a color screen carried by said member and adapted to be moved across said beams of light.

8. In a signal the combination of an indicating member adapted to assume a danger position upon the failure of energy, electromagnetic means for holding said member in a clear position, when said means is energized, an operating electromagnetic device for oscillating said member and adapted to move said member beyond the angle of oscillation into clear position, and means for projecting beams of light and a color scheme carried by said member and adapted to be moved across said beams of light.

9. In a signal the combination of an indicating member adapted to assume a danger position upon the failure of energy, an operating electromagnetic device for oscillating said member and adapted to move said member beyond the angle of oscillation into clear position upon an increase of energy, and energized electromagnetic means for holding said member in the clear position when said operating device is deënergized.

10. In a signal the combination of an indicating member adapted to assume a danger position upon the failure of energy, an operating electromagnetic device adapted to be intermittently energized for oscillating said member, means for causing said device to move said member beyond the angle of oscillation into clear position, and energized electromagnetic means for holding said member in the clear position when said operating device is deënergized.

In testimony whereof, we have signed our names to this specification.

ALLEN B. KENDALL.
OSCAR S. FIELD.